(12) United States Patent
Kelleter et al.

(10) Patent No.: US 10,252,624 B2
(45) Date of Patent: Apr. 9, 2019

(54) DRIVE DEVICE FOR A MOTOR VEHICLE, MOTOR VEHICLE

(71) Applicant: Robert Bosch GmbH, Stuttgart (DE)

(72) Inventors: Arndt Kelleter, Erdmannhausen (DE); Dimitrios Stavrianos, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 15/507,498

(22) PCT Filed: Jul. 31, 2015

(86) PCT No.: PCT/EP2015/067678
§ 371 (c)(1),
(2) Date: Feb. 28, 2017

(87) PCT Pub. No.: WO2016/030133
PCT Pub. Date: Mar. 3, 2016

(65) Prior Publication Data
US 2017/0282725 A1 Oct. 5, 2017

(30) Foreign Application Priority Data
Aug. 29, 2014 (DE) .......... 10 2014 217 298

(51) Int. Cl.
*B60L 11/18* (2006.01)
*B60L 15/00* (2006.01)
(Continued)

(52) U.S. Cl.
CPC ......... *B60L 11/1803* (2013.01); *B60L 15/007* (2013.01); *B60L 15/2036* (2013.01);
(Continued)

(58) Field of Classification Search
CPC .............. B60L 11/1803; B60L 15/2036; B60L 2220/46; H02K 7/006; H02K 16/02;
(Continued)

(56) References Cited

U.S. PATENT DOCUMENTS 5,396,968 A * 3/1995 Hasebe ............... B60K 1/02
180/233
6,743,135 B2 * 6/2004 Klemen ............... B60K 6/26
180/65.235
(Continued)

FOREIGN PATENT DOCUMENTS

CN 101106307 A 1/2008
CN 201821237 U 5/2011
(Continued)

OTHER PUBLICATIONS

International Search Report for Application No. PCT/EP2015/067678 dated Feb. 18, 2016 (English Translation, 3 pages).
(Continued)

*Primary Examiner* — Joseph M Rocca
*Assistant Examiner* — Michael R Stabley
(74) *Attorney, Agent, or Firm* — Michael Best & Friedrich LLP

(57) ABSTRACT

The invention relates to a drive device (8) for a motor vehicle (1) having two drivable wheels (6, 7) on a wheel axle (3), said drive device comprising an electric machine (9), which is designed as an asynchronous machine and which has at least one stator (10) and at least one rotor (11, 12), wherein the rotor (11, 12) is or can be operatively connected to at least one of the wheels (6, 7) in order to drive said wheel. According to the invention, the electric machine (9) has two rotors (11, 12), which can rotate independently of one another, each of which is or can be operatively connected to one wheel (6, 7) of the wheel axle (3), and a device for varying the electric rotor resistance of at least one of the rotors (11, 12).

9 Claims, 2 Drawing Sheets

(51) Int. Cl.
  *B60L 15/20* (2006.01)
  *H02K 7/00* (2006.01)
  *H02K 16/02* (2006.01)
  *H02K 17/18* (2006.01)

(52) U.S. Cl.
  CPC ............ *H02K 7/006* (2013.01); *H02K 16/02* (2013.01); *H02K 16/025* (2013.01); *H02K 17/185* (2013.01); *B60L 2220/46* (2013.01); *B60L 2220/52* (2013.01); *B60L 2240/24* (2013.01); *B60L 2240/421* (2013.01); *B60L 2240/423* (2013.01); *B60L 2240/461* (2013.01); *B60L 2270/145* (2013.01); *Y02T 10/641* (2013.01); *Y02T 10/645* (2013.01); *Y02T 10/7005* (2013.01); *Y02T 10/72* (2013.01); *Y02T 10/7275* (2013.01)

(58) Field of Classification Search
  CPC .. H02K 16/025; B60K 6/26; B60K 2006/266; B60K 6/448
  See application file for complete search history.

(56) References Cited

U.S. PATENT DOCUMENTS

| | | | | |
|---|---|---|---|---|
| 7,276,005 B2* | 10/2007 | Morikawa | ............ | B60K 17/046 475/5 |
| 7,686,726 B2* | 3/2010 | Thompson | ............. | B62D 11/02 475/150 |
| 8,118,704 B2* | 2/2012 | Sugai | ..................... | B60K 6/445 477/111 |
| 8,210,974 B2* | 7/2012 | Moeller | ................... | B62M 6/65 180/65.51 |
| 8,641,568 B2* | 2/2014 | Knoblauch | ............... | B60K 1/02 180/65.6 |
| 8,678,118 B2* | 3/2014 | Takenaka | ................. | B60K 1/02 180/65.1 |
| 8,914,179 B2* | 12/2014 | Tsuchiya | .................. | B60K 6/30 310/80 |
| 9,145,961 B2* | 9/2015 | Suzuki | ................... | B60K 6/448 |

FOREIGN PATENT DOCUMENTS

| | | |
|---|---|---|
| CN | 103238266 A | 8/2013 |
| FR | 884230 | 8/1943 |
| GB | 2506111 | 3/2014 |

OTHER PUBLICATIONS

Kawamura, A. et al., "Analysis of Anti-Directional-Twin-Rotary Motor Drive Characteristics for Electric Vehicles", IEEE Transactions on Industrial Electronics, vol. 44, No. 1, Feb. 1, 1997.

Kelecy et al., "Control Methodology for Single Stator, Dual-Rotor Induction Motor Drives for Electric Vehicles," Record of the Annual Power Electronics Specialists Conference (PESC), vol. 1, Jun. 12, 1995, pp. 572-578.

\* cited by examiner

DRIVE DEVICE FOR A MOTOR VEHICLE, MOTOR VEHICLE

BACKGROUND OF THE INVENTION

The invention relates to a drive device for a motor vehicle that comprises two drivable wheels on a wheel axle, said drive device having an electric machine that comprises at least one stator and at least one rotor, wherein the rotor can be operatively connected to at least one of the wheels, in other words to the drive of said one wheel.

The invention further relates to a motor vehicle that comprises a wheel axle having two drivable wheels, as well as a drive device for driving the wheels.

Drive devices for motor vehicles of the type mentioned in the introduction are known in the prior art. Usually, in the case of motor vehicles, two wheels of a wheel axle, in other words by way of example the wheels of the front wheel axle or the wheels of the rear wheel axle, are driven by means of a drive device. The term 'wheel axle' is to be understood in this respect, regardless of whether the wheels of the axle are steerable or operatively connected to one another in a mechanical manner, to be an imaginary axle of the motor vehicle and two wheels that are in operative contact with a roadway are arranged spaced apart from one another on said imaginary axle. It is known in order to drive the two wheels to connect a drive machine, by way of example an internal combustion engine or an electrical machine, by means of a differential gear to both wheels or rather to the drive shafts that are connected to the wheels. The differential gear renders it possible for the driven wheels to run at different rotational speeds as a result of which the driving stability of the vehicle increases, especially when negotiating bends.

In the case of drive devices that comprise multiple drive machines, different possibilities arise in order to replace the differential gear. A special form represents the so-called tandem drive, wherein a single drivable electric machine is provided for each wheel. The function of the differential gear is assumed by means of the control and/or regulation of the electrical machines. Since it is necessary to provide two electrical machines and also two corresponding control units/power output stages, a solution of this type is relatively expensive.

SUMMARY OF THE INVENTION

The drive device in accordance with the invention has the advantage that the number of components, production costs and installation costs are reduced whilst maintaining a consistent functionality. In accordance with the invention, it is intended for this purpose that the electrical machine is embodied as an asynchronous machine and comprises two rotors that can rotate independently of one another or are rotatably mounted, said rotors being operatively connected or can be operatively connected in each case to a wheel of the wheel axle, and said electrical machine comprises a device for changing the electrical rotor resistance of at least one of the rotors in particular in a continuous manner. By means of actuating the device for changing the electrical rotor resistance of at least one of the rotors, the performance of the rotor concerned can be influenced independently of a control of the electrical machine. By means of changing the rotor resistance, the rotational speed and/or the torque of a rotor can consequently be changed in a simple manner. As a consequence, it is possible to simplify the control of the machine, in that by way of example only one power output stage is provided and a performance difference is produced at the rotors by means of changing the electrical rotor resistance of at least one of the rotors.

In accordance with an advantageous further development of the invention, it is provided that the device comprises at least one semiconductor switch that is connected in series to a phase of a winding of the rotor, said winding comprising in particular multiple phases, and said semiconductor switch can be controlled so as to change the electrical resistance of the phase. The semiconductor switch is switched for this purpose by way of example into a linear mode in order to influence the resistance of the phase and consequently also to influence the rotor resistance. Alternatively, it can also be provided that the device comprises a potentiometer for adjusting the electrical resistance of the phase. In accordance with an advantageous further development of the invention, it is provided that the device comprises for multiple phases of the winding in each case a semiconductor switch for changing the electrical resistance of the respective phase. In particular, it is provided that a controllable semiconductor switch is provided for each phase of the winding. In this case, the term 'phase of the winding' is understood to mean in particular a winding wire of the winding, said winding wire being connected in particular to the device, so that the electrical resistance of the respective phase can be changed by means of the device.

Furthermore, it is preferably provided that the electrical machine comprises one stator that cooperates with the two rotors. It is provided for this purpose that the stator extends along the axes of rotation of the rotors over and beyond both rotors, which are expediently orientated in alignment with one another. For the one stator, only one inverter is necessary for operating the electrical machine. A rotational speed difference between the two wheels or the rotors is possible by means of the device for changing the electrical rotor resistance.

Furthermore, it is preferably provided that the electrical machine comprises in each case a stator for each of the rotors. As a result, it is possible to use cost-effective standard components for the electrical machine. On the basis of the advantageous device, the two stators can however be operated in an identical manner so that the expenditure in relation to the control of the stators can be reduced by means of the device.

It is preferably provided that the drive device comprises only one inverter for operating the two stators. Since the two stators can be operated in an identical manner, one inverter or one power output stage is sufficient for operating the electrical machine or the two rotors. The costs for a second inverter are accordingly avoided by virtue of providing only one inverter.

In accordance with an advantageous further development of the invention, it is provided that the two stators are connected in series. As a result, the expenditure relating to the cabling for connecting the inverter to the two stators is reduced to a minimum.

Alternatively, it is preferably provided that the stators are connected in parallel to one other. As a result, the two stators are connected in each case to the inverter. Although this produces an increased expenditure relating to the cabling, it does however result in the voltage being used more efficiently.

In accordance with an advantageous further development of the invention, it is provided that the rotors together with the respective stator form in each case an asynchronous machine. For this purpose, the windings or phases of the rotors of the electrical machines are in each case connected to the device or attached thereto. By means of the device, the electrical rotor resistance of the respective rotor can be adapted or adjusted in a simple manner as previously described.

Subsequently, it is preferably provided that the device is allocated at least one slip ring device for electrically contacting the at least one phase of the winding of the rotor, it is intended that the electrical resistance of said winding is to change. As a result, the device can be embodied in an essentially fixed manner. In particular, the potentiometer or the semiconductor switch can be arranged on a fixed housing component of the electrical machine or of the motor vehicle and can make electrical contact with the respective phase of the selected rotor by means of the slip ring device. In other words, the otherwise short-circuited phase of the winding is guided out of the rotatable rotor by means of the slip ring device, whereby it is possible to control the potentiometer or semiconductor switch outside of the rotor in a simpler and more cost-effective manner.

The motor vehicle in accordance with the invention is characterized by means of the embodiment in accordance with the invention of the drive device. The aforementioned advantages are produced as a result. Further features and advantages are disclosed in the above description and also in the claims.

BRIEF DESCRIPTION OF THE DRAWINGS

The invention is further explained hereinunder with reference to the drawing, in which hereinunder.

DETAILED DESCRIPTION

Figure 1:
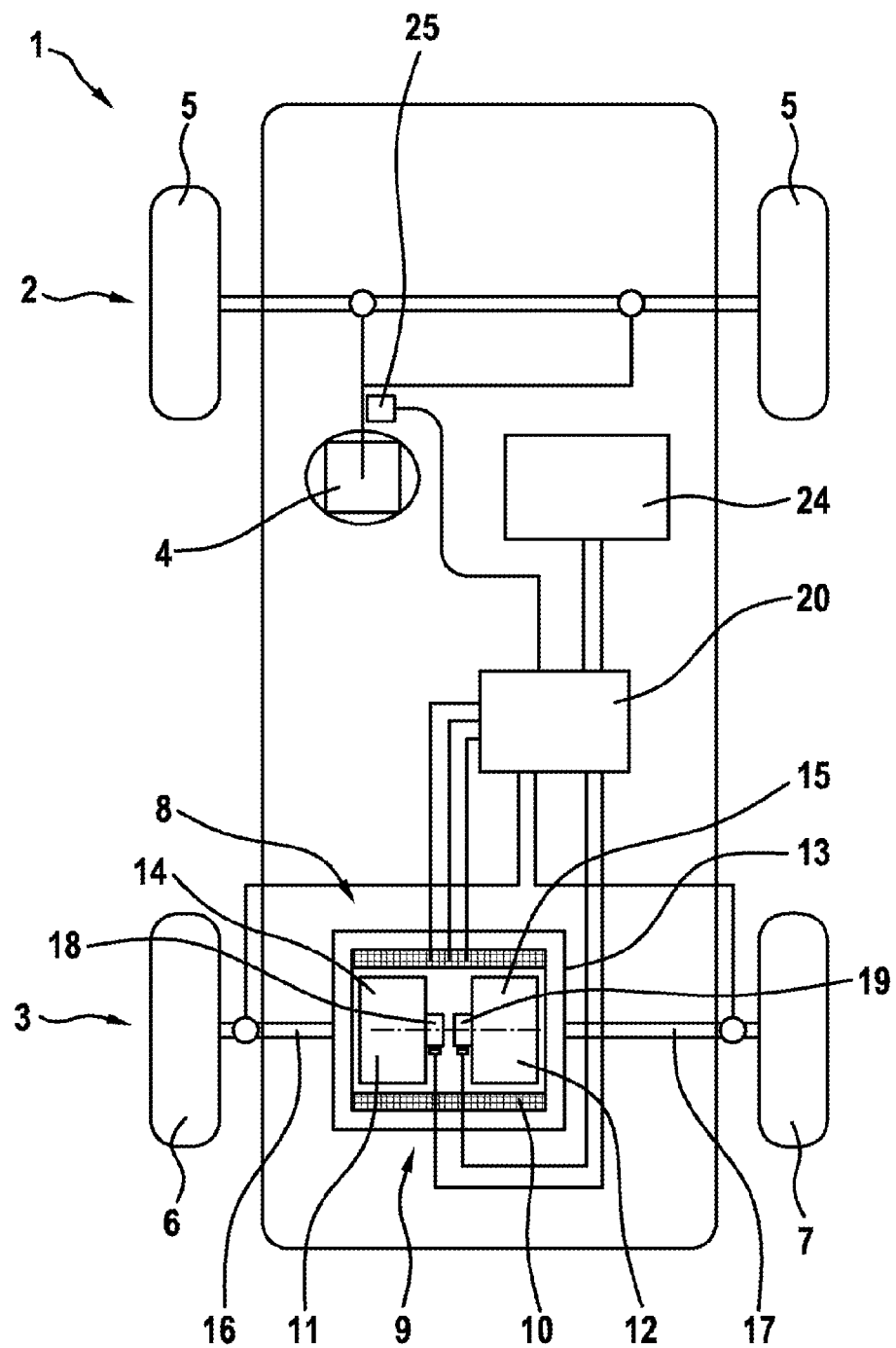
FIG. 1 is a simplified illustration of a motor vehicle having an advantageous drive device.

FIG. 1 illustrates a simplified plan view of a motor vehicle 1 comprising two wheel axles 2 and 3, wherein the front wheel axle 2 is embodied as a steerable wheel axle 2 and the rear wheel axle 3 is embodied as a drivable wheel axle 3. For this purpose, the front wheel axle 2 is allocated a steering device 4 by means of which wheels 5 of the front wheel axle 2 can be steered. The rear wheel axle 3 comprises two wheels 6 and 7, said wheels being drivable by means of a drive device 8. The drive device 8 is embodied in this case as an electrical drive device.

For this purpose, the drive device 8 comprises an electrical machine 9, said electrical machine being embodied as an asynchronous machine, and a stator 10 and two rotors 11, 12 that are mounted in such a manner as to be able to rotate independently of one another. The rotors 11, 12 are embodied in this case as internal runner rotors 11, 12 that are arranged within the stator 10. Axes of rotation of the rotors 11, 12 are arranged in this case in alignment with one another and in a coaxial manner with respect to the stator 10. The rotors 11, 12 are in this case rotatably mounted in particular by means of slide bearings or rolling elements in a conventional manner in a housing 13 that also supports the stator 10. Each of the rotors 11, 12 comprises a winding 14, 15.

The rotor 11 is operatively connected to the wheel 6 by means of a drive shaft 16 and the rotor 12 is operatively connected to wheel 7 by way of a drive shaft 17. Furthermore, each of the rotors 11, 12 is allocated a slip ring device 18, 19 by means of which electrical contact can be made with at least one of the phases of the respective rotors 11, 12. It is provided in this case that respectively one phase of the rotor is guided outwards by means of the slip ring device 18 or 19. In this case, the phase that is guided outwards, as illustrated in FIG. 1, is guided to an electronic power system 20 that also operates the stator 10.

Figure 2:
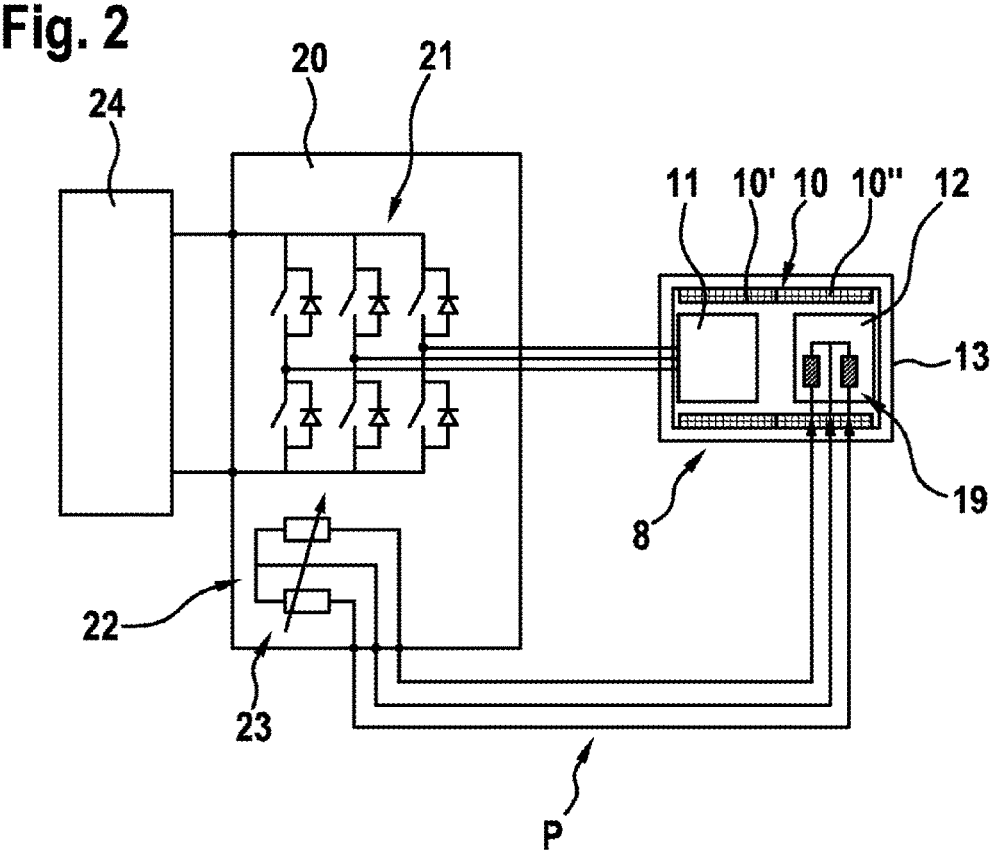
FIG. 2 is a schematic illustration of the drive device of the motor vehicle in a schematic representation.

FIG. 2 illustrates for this purpose a simplified detailed view of the drive device 8. The electronic power system 20 comprises an inverter 21 that comprises a conventional bridge circuit for operating the stator 10. Furthermore, the electronic power system 20 comprises a device 22 that is used for the purpose of adjusting the electrical resistance of the phase of the corresponding rotor, said phase being guided outwards by means of the slip ring device 18 or 19 and only illustrated in this figure for the rotor 12. For this purpose, the device 22 comprises a semiconductor switch 23.

Figure 3:
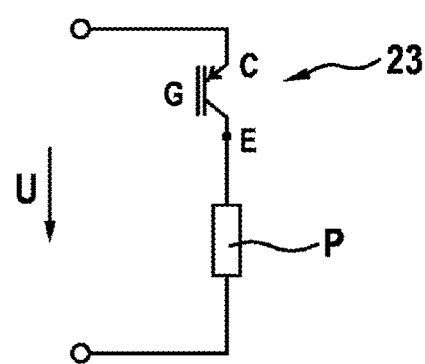
FIG. 3 is a simplified detailed view of a device of the drive device.

FIG. 3 illustrates for this purpose a simplified representation of the device 22. The outwards-guided phase P of the winding 15 of the rotor 12 is connected in series to the semiconductor switch 23. In order to influence the electrical resistance of the phase P, the semiconductor switch 23 is switched into a linear mode. As a result, the electrical resistance of the phase P can be adjusted to a desired resistance. A corresponding device is also expediently provided for the rotor 11. The device 22 can (as illustrated) be allocated in this case to the electronic power system 20 or to a control unit of the motor vehicle 1 or can be provided separately.

The drive device 8 is furthermore allocated an electrical accumulator 24 in the form of a rechargeable battery. The energy that is provided by the electrical accumulator 24 is made available to the stator 10, for operating the electrical machine 9, by means of the inverter 21 that is preferably controlled in a pulse width modulated manner. The magnetic field that is generated by means of the stator 10 influences the two rotors 11 and 12 equally, so that the wheels 6 and 7 are initially influenced with an equal amount of torque during operation. However, by means of actuating the device 22, wherein the electrical resistance of the winding 14 and/or of the rotor 11 or 12 is changed, the performance that is provided by the respective rotor 11, 12 and acts on the wheels 6, 7 changes. As a consequence, various rotational speeds and/or torque occur at the wheels 6, 7. This can be advantageous by way of example while negotiating bends in order to guarantee the driving stability of the motor vehicle 1.

By means of the advantageous and above described drive device 8, the otherwise conventional differential gear is consequently replaced on the driven wheel axle 3 of the motor vehicle 1. The respective rotor 11 and 12, together with the stator 10, form in each case an asynchronous machine. By means of changing of the electrical resistance at least of one of the rotors 11 or 12, various rotational speed and torque conditions are achieved, in particular in a continuous manner. In the described exemplary embodiment, the two phases of the respective winding 14, 15 are controlled by means of the respective device 22. It goes without saying that windings that have more than two phases, in particular three phases, are also feasible. As an alternative to using the semiconductor switch 23 that is preferably developed as MOSFET or IGBT, it is also feasible to provide a potentiometer. The number of slip rings of the slip ring devices 18, 19 depends on the number of phases of the respective rotor winding 14, 15, said phases being guided outwards and having an adjustable electrical resistance. The electronic power system 20 controls the device 22 accordingly. This can occur by way of example in dependence upon a steering angle that has been adjusted by the steering device 4 and has been communicated to the electronic power system 20 by way of example by means of a steering angle sensor 25. It is also feasible to regulate the device 22 for the respective rotor 11, 12, in dependence upon a prevailing actual rotational speed of the respective wheel 6, 7 or the respective drive shaft 16, 17.

Optionally, the driven wheels 6, 7 will be allocated additional spring deflection sensors that detect the spring deflection of a suspension system that supports the respective wheel 6, 7 during the operation of the motor vehicle 1 in order to adjust the wheel rotational speeds of the asynchronous machine at various spring deflections of the wheels 6, 7 by means of a corresponding adjustment of the electrical resistance of the winding 14 or 15 by means of the device 22. The drive device 8 thus also fulfills the function of the differential gear, said function rendering it possible to balance out the travel path length in the case of larger bumps or potholes. If both wheels travel over a bump, the distance travelled by the two wheels is equal and it is not necessary to adjust the rotational speed. If one wheel travels over a bump, differing travel path lengths would occur, making it necessary to adjust the rotational speed, which is achieved in this case by means of the drive device 8 and the control of the device 22.

In order to increase the control precision of the drive device 8, it is provided in accordance with a further exemplary embodiment that, in lieu of a common stator 10 being provided for each of the rotors 11,12, a dedicated stator 10' and 10", as illustrated in FIG. 2, is provided. In a first case, the two stators are then connected in parallel for this purpose and the electronic power system 20 is to be connected to both stators 10', 10". In a second case, the two stators 10', 10" are connected in series, whereby the operating voltage is spread across both stators. The electronic power system 20 thereby controls an electrical machine that is connected in series. Fundamentally, it is sufficient to provide one single electronic power system 20 or one single inverter 21, in particular one single B6-bridge circuit. However, it goes without saying that it is also feasible to provide two power modules that are connected in a parallel manner and comprise in each case one inverter in order to achieve a high performance of the drive device 8.

In contrast to the described design examples, it is also possible to provide only one of the rotors 11, 12 with a slip ring device 18, 19, so that also only the electrical resistance of one of the windings 14, 15 can be changed by means of the device 22. The advantage of the drive device 8 already arises if the electrical resistance even of only one of the rotors 11, 12 or the winding 14, 15 can be adjusted in particular in a continuous manner. It is preferred that the rotors 11, 12 and the one or two stators together with the electronic power system 20 are provided in a common housing so that they form an axle module that can be handled and mounted in a simple manner.

The invention claimed is:

1. A drive device (8) for a motor vehicle (1), said motor vehicle comprising two drivable wheels (6, 7) on a wheel axle (3), the drive device (8) comprising:
   an electrical machine (9) having at least one stator (10) and at least one rotor (11, 12) wherein the rotor (11, 12) is operatively connected or can be operatively connected to at least one of the drivable wheels (6, 7), wherein the electrical machine (9) includes
   two rotors (11, 12) that can rotate independently of one another and are operatively connected or can be operatively connected in each case to a wheel (6, 7) of the wheel axle (3), and
   a device (22) for changing the electrical rotor resistance of at least one of the rotors (11, 12), wherein the device (22) comprises at least one semiconductor switch (23), said semiconductor switch being connected in series to one phase (P) of a winding (14, 15) of the rotor (11, 12), said winding comprising multiple phases, and said semiconductor switch being controllable so as to change the electrical resistance of the phase (P).

2. The drive device as claimed in claim 1, wherein the electrical machine (9) comprises only one stator (10) that cooperates with the two rotors (11, 12).

3. The drive device as claimed in claim 1, wherein the electrical machine (9) comprises in each case a stator (10', 10") for each of the rotors (11, 12).

4. The drive device as claimed in claim 3, wherein the drive device (8) comprises only one inverter (21) for operating the stators (10, 10', 10").

5. The drive device as claimed in claim 3, wherein the stators (10', 10") are connected in series.

6. The drive device as claimed in claim 3, wherein the stators (10, 10") are connected in parallel to one another.

7. The drive device as claimed in claim 1, wherein the rotors (11, 12) together with the respective stator (10, 10', 10") form in each case an asynchronous machine.

8. The drive device as claimed in claim 1, wherein the device (22) comprises a slip ring device (18, 19) for at least one of the rotors (11, 12) for electrically contacting at least one phase (P) of the winding (14, 15) of the rotor (11, 12).

9. A motor vehicle (1) having at least one wheel axle (3) that comprises two drivable wheels (6, 7) and having a drive device (8) according to claim 1.

* * * * *